(No Model.) 3 Sheets—Sheet 1.
N. O. WESTBERG.
BAND CUTTER AND FEEDER.
No. 508,855. Patented Nov. 14, 1893.
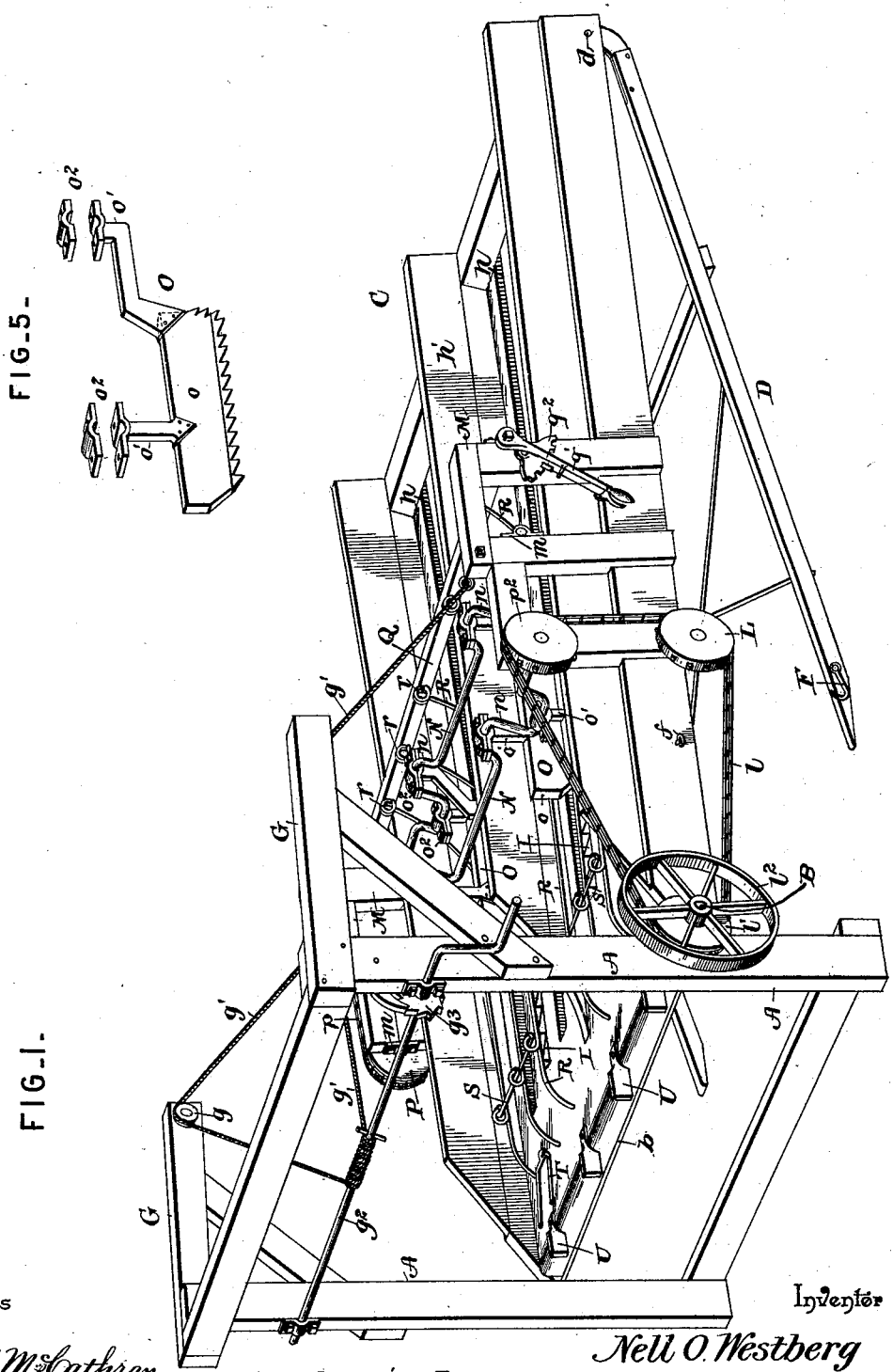
Witnesses
Jas. K. McCatpran
L. P. Wickhaupter
Inventor
Nell O. Westberg
By his Attorneys,
C. A. Snow & Co.

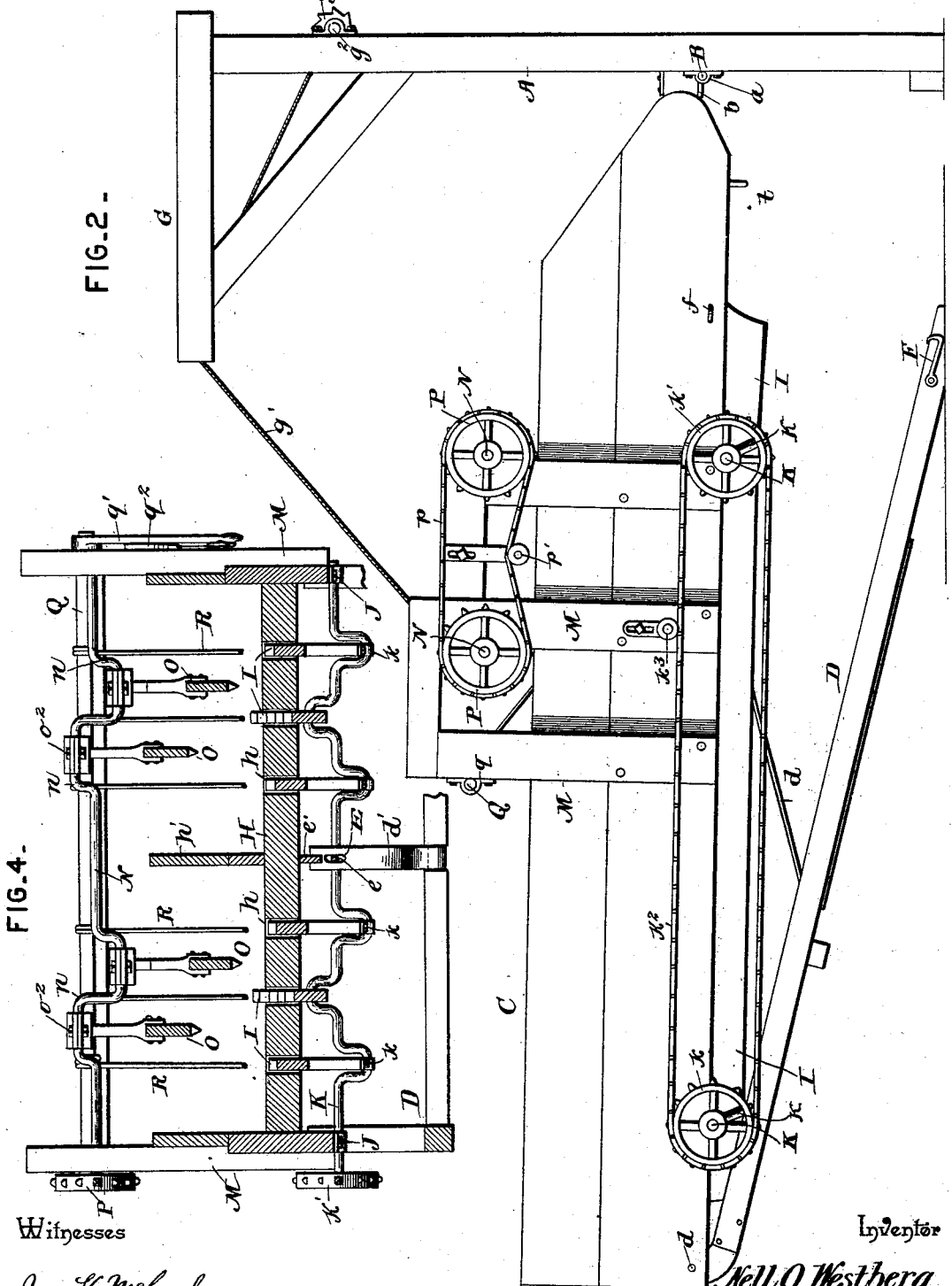

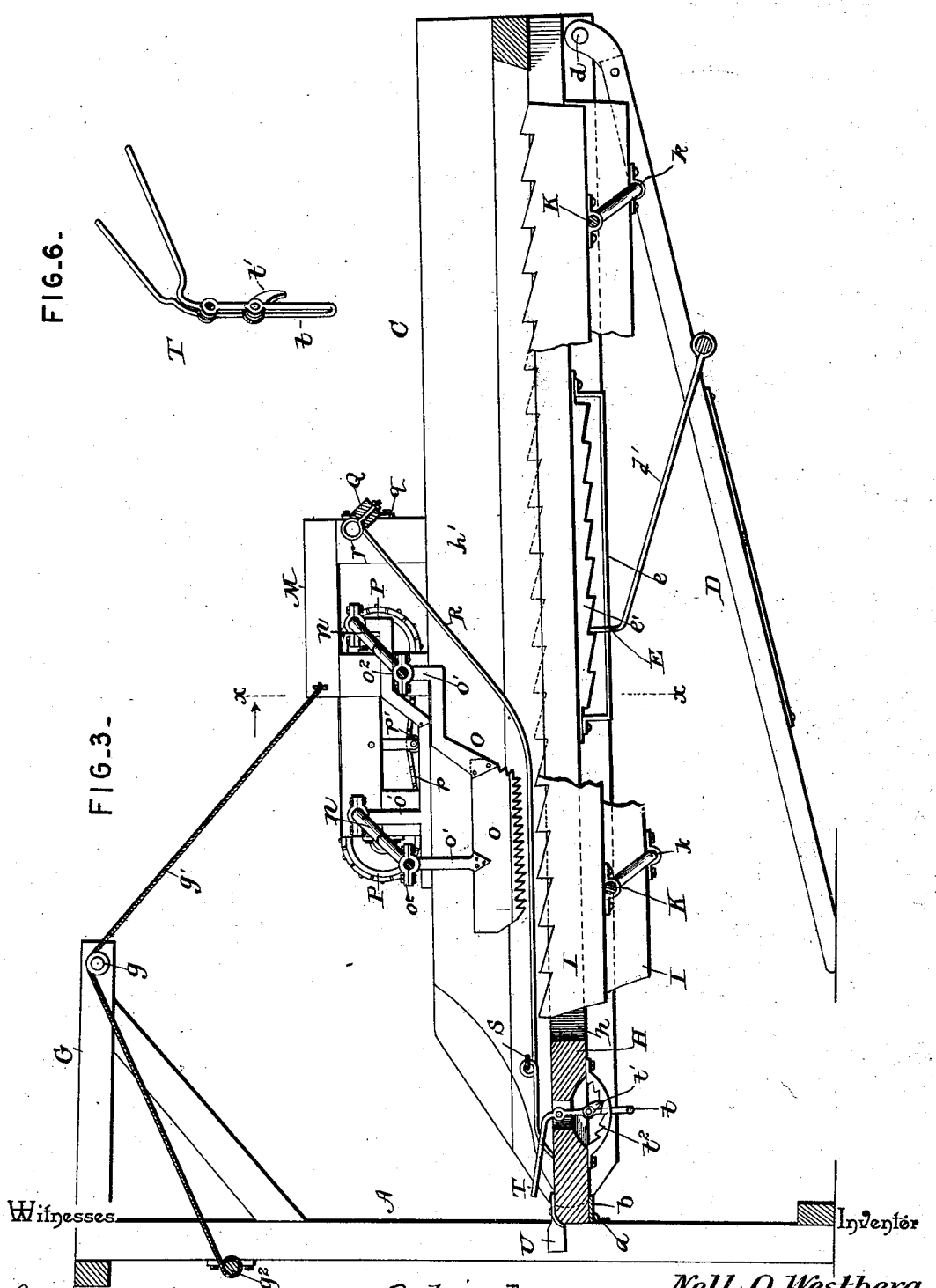

UNITED STATES PATENT OFFICE.

NELL O. WESTBERG, OF SANBORN, IOWA.

BAND-CUTTER AND FEEDER.

SPECIFICATION forming part of Letters Patent No. 508,855, dated November 14, 1893.

Application filed March 25, 1893. Serial No. 467,544. (No model.)

*To all whom it may concern:*

Be it known that I, NELL O. WESTBERG, a citizen of the United States, residing at Sanborn, in the county of O'Brien and State of Iowa, have invented a new and useful Band-Cutter and Feeder, of which the following is a specification.

This invention relates to band cutters and feeders; and it has for its object to provide certain improvements in machines of this character whereby bundle or loose grain is evenly and regularly fed into the cylinder of the thrashing machine, and which shall provide efficient means for effectually cutting the bands and thoroughly spreading and distributing the grain into the thrashing machine cylinder.

To this end the main and primary object of the invention is to simplify the construction of band cutters and feeders as well as to insure efficient operation.

With these and many other objects in view which will readily appear as the nature of the invention is better understood, the same consists in the novel construction, combination and arrangement of parts, hereinafter more fully described, illustrated and claimed.

In the accompanying drawings:—Figure 1 is a perspective view of a band cutter and feeder constructed in accordance with this invention. Fig. 2 is a side elevation thereof from the side opposite to that shown in Fig. 1. Fig. 3 is a central vertical longitudinal sectional view of the same. Fig. 4 is a vertical transverse sectional view on the line $x$—$x$ of Fig. 3. Fig. 5 is a detail in perspective of one of the vibrating band cutting knives. Fig. 6 is a similar view of one of the adjustable spreading forks.

Referring to the accompanying drawings, A represents an upright attachment frame adapted to be arranged adjacent to the cylinder of a thrashing machine, and carries up on its opposite vertical posts the bearings $a$, in which are journaled the transverse combined pivots and journals B, projecting from each end of the pivot bar $b$, to which is attached the delivering end of the feeder frame C. The feeder frame C, which is thus pivotally attached at its inner delivering end to the frame A, is supported at any adjusted position at its outer end on the hinged leg frame D.

The hinged leg frame D, is hinged at its extremities at $d$, to the extreme outer end of the feeder frame C, and carries a pivoted spring supporting arm $d'$. The spring supporting arm $d'$, is of an angular shape, and is pivoted at one end to said pivoted leg frame, and at its other end is provided with a perforation E, which is adapted to slide over the depending guide bar or rod $e$, secured to the bottom of the feeder frame C, directly under the toothed adjusting bar or rack $e'$, also secured to the bottom of the feeder frame as will be clearly seen in the drawings. The unpivoted ends of the arm $d'$, which slide on said guide bar or rod are adapted to engage the teeth of said toothed bar or rack, so that the leg frame can be easily folded from under the bottom of the feeder frame while at the same time preventing it from returning back under the feeder frame except by hand, thus providing an improved construction for holding the outer end of the feeder frame in any adjusted position. When the machine is not in use the leg frame may be folded back under the feeder frame and held thereunder by means of the hooks F, on the leg frame which engage the eyes $f$, on the opposite sides of the feeder frame.

The upright frame A, is provided with the parallel offstanding frame arms G, carrying at their extremities the guide pulleys $g$, over which pass the lifting cords or wires $g'$. The lifting cords or wires $g'$, are attached at one end to the opposite sides of the feeder frame and at their other ends to the winding shaft $g^2$, journaled in suitable bearings on the frame A, and having the pawl and ratchet attachment $g^3$, which provides for holding the feeder frame in any adjusted position, the leg frame herein-before described dropping of its own weight to the adjusted position of the feeder frame, which, when not in use is folded entirely out of position, being of course understood that the frame A, may be attached to the thrashing machine itself.

The feeder frame C is flared toward its outer receiving end so as to readily accommodate the bundles or loose grain cast thereon, and converges toward its inner delivering end. The same is provided with a flat feeding platform, H, provided with a series of longitudinal slots $h$, and a central partition board $h'$, dividing the platform into separate feeding portions or ways. The grain which is cast onto the receiving end of the adjustable feeder frame C, is fed toward the delivering end thereof, and into the thrashing machine by means of series of longitudinal vibrating feed bars I having upper notched edges. The longitudinal vibrating feed bars I, extend nearly the entire length of the platform H, and are provided on their under edges near their opposite ends with the boxes $k$, which receive the cranks of the multiple crank shafts K. The multiple crank shafts K, are journaled in the boxes J, secured to the lower edges of the opposite sides of the feeder frame C, and both of said shafts carry at one end the sprocket wheels $k'$, which receive the endless chain $k^2$, passing thereover and an intermediate idler $k^3$, thus providing for the simultaneous turning of the multiple crank shafts, so as to insure a longitudinal vibration of the feed bars, it being of course understood that the cranks of one multiple crank shaft are disposed the same as the corresponding cranks of the other shaft. One of said multiple crank shafts is further provided at one end with a sprocket wheel L, over which passes the drive chain $l$, which receives motion from the drive sprocket $l'$, carried by the band wheel $l^2$, journaled on one of the journals B, and receiving motion in the ordinary manner.

Secured to opposite sides of the feeder frame C, at a suitable point intermediate of its ends are the upright side frames M, carrying the oppositely aligned bearing boxes $m$, in which are journaled the ends of the parallel multiple crank knife shafts N. The knife shafts N, have their cranks $n$, arranged in pairs on each side of the central partition board $h'$, and are designed to carry the vibrating band cutting knives O. The vibrating band cutting knives O, have the elongated cutting blades $o$, and the upwardly extended bearing arms $o'$, which carry at their extremities the bearing boxes $o^2$, which removably embrace the cranks of said knife shafts. As clearly seen in the drawings, one of the bearings of a knife embraces the crank of one knife shaft, and the other bearing of the same knife embraces the corresponding crank of the other knife shaft, so that as both knife shafts are simultaneously rotated, the series of band cutting knives will be vibrated or swung longitudinally of the feeder frame above the same, and alternately with respect to each other, in order to insure the effectual cutting of the bands of the bundles. Each of the knife shafts N, carry at one end the sprocket wheels P, which are connected by the endless sprocket chain $p$, passing over an intermediate idler $p'$, and one of said shafts is further provided with a drive sprocket $p^2$, over which passes the drive chain $l$.

An adjustable rock bar Q, is journaled at its ends in suitable bearings $q$, arranged on the side frames M, in advance of the knife shaft, and said rock bar carries at one end the adjusting lever $q'$, working adjacent to the segments $q^2$, so that the said bar can be adjusted and held in its adjusted position. Secured at one end to the rock bar Q, are a parallel series of curved spring retaining rods or arms R. The spring retaining rods or arms R, are provided with spring coils $r$, near their attachment to the rock bar, and the tension of which coils is to normally press the other free end of the spring rods onto the feeder frame, so that the grain will be held onto the notched feeder bars, and so that the same will be held under the vibrating band cutting knives, and prevented from being wrapped on the knife shafts. The free ends of said spring rods are connected by the spacing links S, which serve to hold said spring retaining rods apart from each other.

Directly in advance of the inner extremities of the notched feed bars I, are arranged the adjustable spreading forks T. The adjustable spreading forks T, are formed of single wire rods bent to the proper shape and provided with looped lever ends $t$, extended from the fork tines and pivoted in and working through perforations in the platform H, and such looped lever ends carry between the side portions of the loops the gravity adjusting pawls $t'$ adapted to automatically engage the notches in the upper edges of the segments $t^2$, secured to the bottom of the platform H, near its pivoted end, so as to adjust the angle of said forks, which serve to spread out the grain which is shoved forward by the feed bars, and onto the series of distributing fingers U. The distributing fingers U, are secured to the extreme inner pivoted end of the feeder platform, and combine with the adjustable spreading forks to evenly spread and distribute the grain into the cylinder.

From the foregoing it is thought that the construction, operation and many advantages of the herein-described band cutter and feeder will be apparent to those skilled in the art, and I will have it understood that changes in the form, proportion and the minor details of construction as embraced within the scope of the appended claims may be resorted to without departing from the principle or sacrificing any of the advantages of this invention.

Having thus described my invention, what I claim, and desire to secure by Letters Patent, is—

1. In a feeder for thrashing machines, the feeder frame pivoted at one end to a suitable point of attachment, a toothed adjusting bar or rack secured to the bottom of the feeder frame, a depending guide bar or rod secured to the bottom of the feeder frame under said adjusting bar or rack, the adjustable leg frame pivoted at its outer end to the free movable extremity of the feeder frame and adapted to be folded thereunder, and an angular spring supporting arm pivoted at one end to said leg frame and provided with an opposite perforated end adapted to slide over said guide bar or rod and adapted to engage the toothed adjusting bar or rack, substantially as set forth.

2. In a band cutter and feeder, the combination of the feeder frame having a flat feeding platform extending from end to end and provided with a series of longitudinal slots, a central partition board dividing the platform into opposite ways, longitudinally vibrating feed bars having upper notched edges and adapted to work inside of and above the longitudinal slots of said platform, suitably arranged multiple crank shafts disposed above the platform, a series of longitudinally disposed cutting blades journaled upon said multiple crank shaft and provided with cutting teeth on their lower edges, and the connected retaining rods adjustably supported between the cutting knives over the feed bars, substantially as set forth.

3. In a band cutter and feeder, the combination with the feeding and band cutting devices; of a suitably arranged adjustable attaching bar, and a series of spring rods alternating with the band cutting devices and disposed below and beyond the same and attached at one end to said adjustable attaching bar, said spring rods being provided adjacent to their connections to said bar with spring coils adapted to normally press the free ends of the spring rods onto the feeder frame, substantially as set forth.

4. In a band cutter and feeder, the combination with the feeding devices and band cutters; of a suitably arranged adjustable rock bar disposed over the feeding devices in advance of the band cutters, and a series of parallel curved spring retaining rods attached to said rock bar and having spring coils at one end and spacing links at their other end, substantially as set forth.

5. In a feeder for thrashing machines, the combination with the feeder frame having perforations or openings near its delivering end and the feeding devices mounted on the frame; segments secured to the under side of the frame alongside of the openings therein and having upper notched edges, adjustable spreading forks formed of single wire rods and provided with looped lever ends extended from the fork tines and pivoted in the openings in the frame to dispose the tines beyond such openings, said looped lever ends being adapted to embrace said segments, and gravity adjusting pawls mounted between the side portions of said looped lever ends and adapted to automatically engage the notches in the upper edges of said segments, substantially as set forth.

In testimony that I claim the foregoing as my own I have hereto affixed my signature in the presence of two witnesses.

NELL O. WESTBERG.

Witnesses:
 A. M. DAVIDSON,
 C. WESTBERG.